United States Patent [19]

Liu et al.

[11] 4,358,697
[45] Nov. 9, 1982

[54] TWO-POLE PERMANENT MAGNET SYNCHRONOUS MOTOR ROTOR

[75] Inventors: Joseph C. Liu, Little Rock, Ark.; Paul D. Wagner, Cincinnati, Ohio; John J. Keuper, Cold Spring, Ky.

[73] Assignee: Siemens-Allis, Inc., Atlanta, Ga.

[21] Appl. No.: 294,362

[22] Filed: Aug. 19, 1981

[51] Int. Cl.³ .......................................... H02K 21/12
[52] U.S. Cl. .................................. 310/156; 310/261; 310/162
[58] Field of Search ............... 310/211, 156, 162, 165, 310/261, 265

[56] References Cited

U.S. PATENT DOCUMENTS

| 3,492,520 | 1/1970 | Yates | 310/162 X |
| 3,840,763 | 10/1974 | Baumann et al. | 310/156 |
| 4,127,786 | 1/1978 | Volkrodt | 310/156 |
| 4,139,790 | 2/1979 | Steen | 310/156 |
| 4,324,996 | 4/1982 | Adelski et al. | 310/156 |

Primary Examiner—Donovan F. Duggan
Attorney, Agent, or Firm—F. W. Powers, III

[57] ABSTRACT

A permanent magnet rotor configuration which produces two magnetic poles. Two pairs of axial slots are provided in which permanent magnets are arranged about the rotor shaft. A third, diametrically opposed pair of slots is provided which extend radially outwardly and in which permanent magnets are disposed. Off-axis magnetic bridges are formed on either side of the third slots, separating them from the first and second sets of slots.

7 Claims, 1 Drawing Figure

TWO-POLE PERMANENT MAGNET SYNCHRONOUS MOTOR ROTOR

BACKGROUND OF THE INVENTION

This invention relates to permanent magnet synchronous motors, and more particularly to an improved rotor construction for two-pole permanent magnet rotors.

In some applications it has been found desirable to use motors of relatively small diameters, and which rotate in precise synchronism with an applied rotating field. Generally such small-diameter motors have usually been induction motors, it having been difficult in the past to construct true synchronous motors which are small, capable of rotating at high speeds, and having the necessary torque. Because of the small size and high speed of such motors, it has been difficult and prohibitively expensive to utilize segmented rotor construction and/or wire wound salient poles in the manner of ordinary synchronous motors.

In one approach to providing a rugged motor which exhibits synchronous characteristics, motor designers have turned to synchronous reluctance designs. Synchronous reluctance motors may be generally thought of as induction motors whose rotors have been provided with flux barriers which cause the magnetic reluctance of the rotor to vary with rotor orientation, in effect providing magnetic poles which "follow" the rotating magnetic field produced by the stator windings. Examples of such synchronous reluctance rotors are illustrated in U.S. Pat. No. 3,652,885—Honsinger and U.S. Pat. No. 3,862,446—Hilgeman et al. The flux barriers of these motors are constituted by axial slots extending through the stacked rotor laminations, which are filled with a nonmagnetic, high-reluctance material such as die cast aluminum. Such motors are typically provided with a set of axial rotor bar slots near the peripheries thereof, much in the manner of ordinary induction motors.

With the availability of high-strength permanent magnets, the cast flux barriers were replaced with magnets. With this approach, the magnets give rise to magnetic poles which interact with the stator flux to achieve synchronous motor operation. In effect, the permanent magnets take the place of electromagnetic windings of conventional synchronous motors. One example of such a construction is disclosed in U.S. Pat. No. 4,139,790—Steen.

Early construction of such permanent magnet motors closely followed synchronous reluctance motor layouts, by simply substituting blocks of magnetic material for die cast aluminum flux barriers. Subsequent investigations have shown that numerous design parameters must be modified in order to obtain permanent magnet motors which have the desired operating charcteristics while at the same time being relatively easy to manufacture, and strong enough to resist the forces arising during high speed operation. Because of the high speeds required of such motors the mechanical strength of the rotor laminations is of considerable importance, and must be maintained. Further, the pre-formed permanent magnets utilized for such rotors are ordinarily produced in the shape of rectangular bars which must be pressed into the rotor body, giving rise to exacting mechanical design considerations. In addition the rare earth magnets which are now often used in such rotors are very expensive, which makes it desirable to limit the number and volume of the magnets. On the other hand, it is desirable to array the magnets in a manner which provides the maximum magnetic area for each pole. Still another consideration is the cost of the magnets, which makes it desirable to utilize magnets of a common size and shape.

It will therefore be appreciated that it would be highly desirable to provide an improved two-pole permanent magnet rotor which is mechanically strong, while using less magnetic material and exhibiting better performance characteristics than those previously known.

Accordingly, it is an object of the invention to provide an improved two-pole rotor for a permanent magnet synchronous motor.

Another object is to provide a two-pole permanent magnet synchronous motor rotor which exhibits improved torque charcteristics and makes better use of magnetic materials than those herein before known.

Yet another object is to achieve an advantageous rotor design utilizing magnets of a common size and shape.

SUMMARY OF THE INVENTION

Briefly stated, in accordance with one aspect of the invention the foregoing objects are achieved by providing a plurality of laminations which are stacked together to form a rotor body. The laminations are provided with openings which align with one another to define passages ("slots") extending axially through the rotor body. The slots which receive the magnets are arrayed generally tangentially about the rotor shaft, and separated along a first axis by magnetic bridges formed integrally with the laminations.

Another group of slots, lying along a common diametrical line but at opposite sides of the rotor, extend outwardly to a point near the edge of the rotor, being interleaved with the rotor bar openings. The latter slots extend radially inwardly to a point between adjacent magnet slots and define two more pairs of magnetic bridges, also formed integrally with the laminations but lying at an acute angle with the quadrature axis. In a preferred embodiment the innermost ends of the latter slots are generally triangular, being formed by the convergence of the slot sidewalls and the triangular opening formed thereby filled with cast aluminum.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing which is an elevational end view of a rotor body constructed in accordance with principles of the present invention.

DESCRIPTION OF A PREFERRED EMBODIMENT

Figure 1:
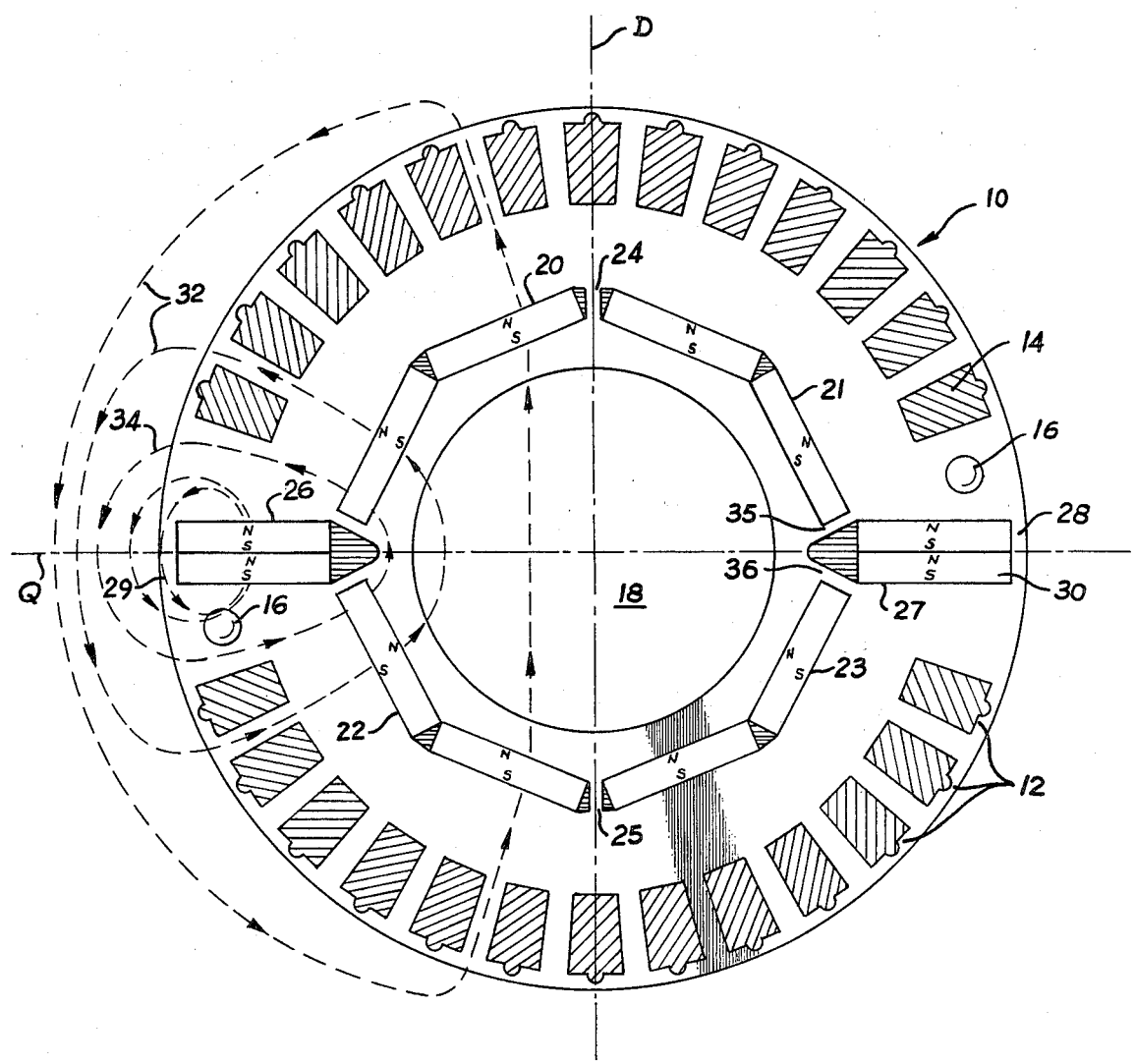

The rotor cross section which is shown in the FIGURE illustrates a rotor body 10 formed of a stack of individual laminations. Each lamination has a pattern of openings punched therein, so that when the laminations are stacked to form a rotor core the openings align to form axially-directed passages or "slots." A first set of slots such as shown at 12 extend about the periphery of the rotor and contain conductive rotor bars 14, as is conventional in induction motor design. The rotor bars 14 may be formed of any appropriate conductive metal and may be driven into the rotor, or cast in place. As will be further explained hereinafter, it is contemplated that the rotor bars will be formed of aluminum, and die cast in the rotor in a single operation.

A pair of symmetrically-disposed holes 16 receive rivets which are deformed after the stack of laminations is compressed and hold the laminations together in the usual manner. A central opening 18 is provided for receiving a rotor shaft upon which the rotor will be journaled. Owing to the design of the illustrated rotor body, the shaft may be formed of a magnetic material. The use of magnetic metal for rotor shafts is of great assistance in minimizing the cost of motor construction.

A first pair of arcuate slots 20, 21 are formed at one side of the rotor body and a similar, second pair of slots 22, 23 formed on the other side so that the arrangement is symmetrical about a diametrical line Q. The first and second pairs of slots are spaced apart by short magnetic bridges 24, 25 respectively. The bridges serve to mechanically connect the rotor portion lying radially outside the magnet slots with the portion lying radially within the slots to resist the centrifugal forces which arise during motor operation.

It will be noted that in comparison with most prior art permanent magnet motors, the magnets disposed within slots 20–23 are relatively thin; that is, the dimensions of the magnets in the polar direction are small. Accordingly, magnetic bridges 24, 25 are relatively short. This enhances the manufacturability of the rotor, as it has been found that rotor designs having long, narrow bridges tend to distort during the manufacturing and handling process and are susceptible of damage. The bridges must necessarily be narrow, as the bridges form flux leakage paths which detract from the efficiency of the motor design. At the same time by utilizing magnets of a single size the cost of manufacturing the rotor is substantially lessened.

A third pair of magnet slots 26, 27 is disposed along diametrical line Q, which corresponds to the quadrature axis of the rotor, so that they extend radially outwardly. These magnets are preferably twice as thick as the magnets disposed in tangential slots 20–23. The outermost ends of the magnet slots terminate at a point close to the edge of the rotor periphery, leaving only a thin bridge of lamination material 28 which is sufficient to withstand the forces which arise during motor operation, without providing a significant flux leakage path. A small amount of flux 29 is necessarily "short circuited" in the rotor material; but owing to the small width of the magnetic path the material saturates readily and therefore does not divert appreciable amounts of magnetic flux from the air gap about the rotor. In this manner, it will be appreciated that the magnets in the third set of magnet slots are generally interleaved with the rotor bars 14 although the magnets therein, generally indicated at 30, do not conduct electric current and do not contritube to motor torque under non-synchronous running conditions as do the rotor bars.

The opposing sides of the third set of magnet slots converge near the inner ends thereof, so that a generally triangular void is formed. The slot edges preferably extend parallel to the nearby ends of magnet slots 21, 23 so that a pair of magnetic bridges 35 and 36 are formed symmetrically about line Q at the inner end of the right-hand radial magnet slot, extending at an acute angle to line Q. Asymmetrical construction is utilized for the left-hand magnet slot. Again, the use of relatively thin permanent magnets allows the bridges to be quite short so that they are less susceptible of injury or distortion during manufacture and handling. Further, it is believed that by placing the bridges off the quadrature axis of the motor improved torque characteristics result.

By orienting the magnetic poles in the manner shown, a "north" pole is constituted at the top center of the rotor, along line D which represents the direct axis of the stator field during synchronous operation. Owing to the symmetrical construction of the rotor, a south pole is effectively produced at the lower center of the rotor in the illustration, also along the direct axis.

Rotors designed in accordance with the teachings of the present invention operate in accordance with conventional principles of synchronous motor operation. Under starting conditions, the stator field effectively rotates about the rotor, the "slip" inducing current into rotor bars 14 which in turn produce torque to accelerate the rotor to a speed approching synchronous speed. The flux pattern produced by the permanent magnets then locks into synchronism with the rotating stator flux field, and continues to rotate in synchronism therewith. Lines of flux, generally illustrated at 32, are provided by the permanent magnets in the first and second pairs of slots which surround the rotor shaft. These lines of flux extend through the magnetic rotor shaft (not present in the illustration), and outwardly across the motor air gap. A negligible amount of flux is "short circuited" through the magnetic bridges which connect the radially inner and outer parts of the lamination, but owing to the narrow nature of the bridges they soon saturate and become a substantially high-reluctance paths. Accordingly, the flux lines for the most part extend radially outwardly from the magnet surfaces, through the rotor teeth between the rotor bars, across the air gap and ultimately return by a similar path. It will be noted that the radially-extending magnets disposed in the third set of magnet slots 26, 27 also serve as a barrier to prevent the lines of flux from re-entering the rotor body prematurely.

Considering the left-hand radial magnet slot 26, flux from magnets in slot 20 is prevented from re-entering the rotor body above the Q axis by the magnets in slot 26. Accordingly, flux is forced to bypass radial slot 26, and travels further about the periphery of the motor before re-entering and approaching the south pole of a magnet in slot 22.

At a point closer to the radially-extending slot other lines of flux 34 are similarly prevented from taking a "short cut" through the rotor body in order to reach nearby magnets in slot 22. Instead, flux lines 34 are forced outwardly into the motor air gap where they contribute to the apparent field set up by the rotor. A small percentage of flux will inevitably flow through the angular magnetic bridges disposed near the base of slot 26, at either sides of axis Q; but by having the triangular void of slots 26, 27 either unfilled, or filled with a non-magnetic material such as die cast aluminum, an effective flux barrier is set up which minimizes flux leakage.

It will be noted that the adjacent ends of slots 20, 21 and also of slots 22, 23 extend past the edges of the rectangular magnets therein, in order to make bridges 24 and 25 as narrow as possible. The small voids at the ends of these slots, and the voids occurring at the "knee" of the slots, between the magnets placed therein, are also filled with die-cast aluminum. In a preferred embodiment, the material which forms rotor bars 14 and fills the voids about the magnets is injected into the rotor body in a single step. The die cast material is forced into the voids about the magnets and locks them into place, as well as providing a low-reluctance magnetic path which discourages stray lines of flux. Alternatively, the voids in the magnet slots could be filled with other materials, either solid or a hardenable fluid such as epoxy resin.

As a consequence of the illustrated invention a highly efficient design is produced which presents a large magnetic surface to each stator pole, which has been found to be an important consideration in permanent magnet motor design. The present inventors have found that the magnetic area presented to the poles is a much more important factor than the volume or thickness of the magnets. Hence, relatively thin magnets may be utilized which in turn allows the magnetic bridges, necessary to connect the inner and outer portions of the laminations, to be quite short. Finally rather than using long, thin magnetic bridges to separate the upper and lower halves of the magnet array about the quadrature axis, the radially-extending magnets are disposed upon the Q-axis and the adjacent magnetic bridges are positioned off the Q-axis, at an acute angle thereto, the mechanical strength of the rotor is improved and the susceptibility of the punchings to damage during manufacture is greatly lessened.

In a preferred embodiment the permanent magnets are of the rare earth variety. The magnets are magnetized transversely as shown so that similar poles face in the same direction, e.g., upward in the FIGURE. This gives rise to a symmetrical flux pattern partially illustrated by flux lines 32 and 34, producing two magnetic poles oriented upon the D axis. Magnets utilizing materials such as samarium cobalt (SmCo5) are preferred in the illustrated embodiment. Such magnets exhibit a very high coercive force, so that the magnets can only be demagnetized by extremely high operating temperatures, on the order of 200° celsius, or by extremely high external magnetic fields which ordinarily result only from accidental overvoltage conditions. The magnets are ordinarily sintered and pressed into a flat, rectangular cross section product which while quite dense is rather brittle and subject to damage unless skillfully handled. Alnico-type magnets may also be used although they have the disadvantge of a relatively low coercivity compared to ferrite and samarium cobalt magnets. At the same time rare-earth magnets cost considerably more than other, similar permanent magnets so that to be economically feasible they require a rotor design which makes optimum use of the volume of magnetic material.

It will now be appreciated that the rotor design illustrated in the FIGURE allows the use of thinner, and therefore less expensive, permanent magnets which are all of a common size with the resulting saving in production cost, while at the same time sacrificing nothing in the way of structural integrity or mechanical strength and in fact having greater structural integrity than comparable prior art designs. Having understood the invention, it will be evident from the foregoing description that certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A two pole rotor for a permanent magnet synchronous motor comprising:
   a plurality of magnetic laminations aligned to form a rotor body, said laminations having openings which align to define
   (i) a set of rotor bar slots disposed about the periphery of the rotor body;
   (ii) a central opening extending axially through said rotor body to define a shaft opening;
   (iii) first and second pairs of magnet slots disposed symmetrically about said central opening, the slots of each pair being separated by a bridge of magnetic material formed integrally with said laminations, said bridges being 180° apart, each of said magnet slots comprising at least two straight segments disposed generally parallel to lines tangent to the periphery of said central opening, and
   (iv) a third pair of magnetic slots lying along a common diametrical line displaced 90° from said magnetic bridges, each one of said third pair of slots extending radially outwardly to a point close to the periphery of said rotor body and inwardly to a point between the ends of the magnet slots of said first and second pair of slots; and
   a plurality of permanent magnets disposed in said magnet slots,
   said bridges aligning with the direct axis of a motor stator when rotor is placed therein and said third pair of magnet slots is aligned with the quadature axis of said stator.

2. A rotor according to claim 1, wherein said inwardly-extending ends of said third pair of magnetic slots are spaced from the adjacent ends of magnet slots to define a pair of magnetic bridges disposed at an acute angle to said common diametrical line.

3. A rotor according to claim 2, wherein the sides of the inner ends of said third pair of slots converge toward a point disposed radially inwardly of said first and second magnet slots.

4. A rotor according to claim 3, wherein said portion of said third pair of slots having converging walls is filled with cast metal.

5. A rotor according to claim 4, wherein said cast metal exhibits low magnetic permeability.

6. A rotor according to claim 5, wherein each one of said third pair of slots contains at least two generally rectangular permanent magnets of a common size and shape.

7. A rotor according to claim 1, further comprising at least two holes extending axially therethrough and disposed in an area between said third magnet slots and a rotor bar slot.

* * * * *